UNITED STATES PATENT OFFICE.

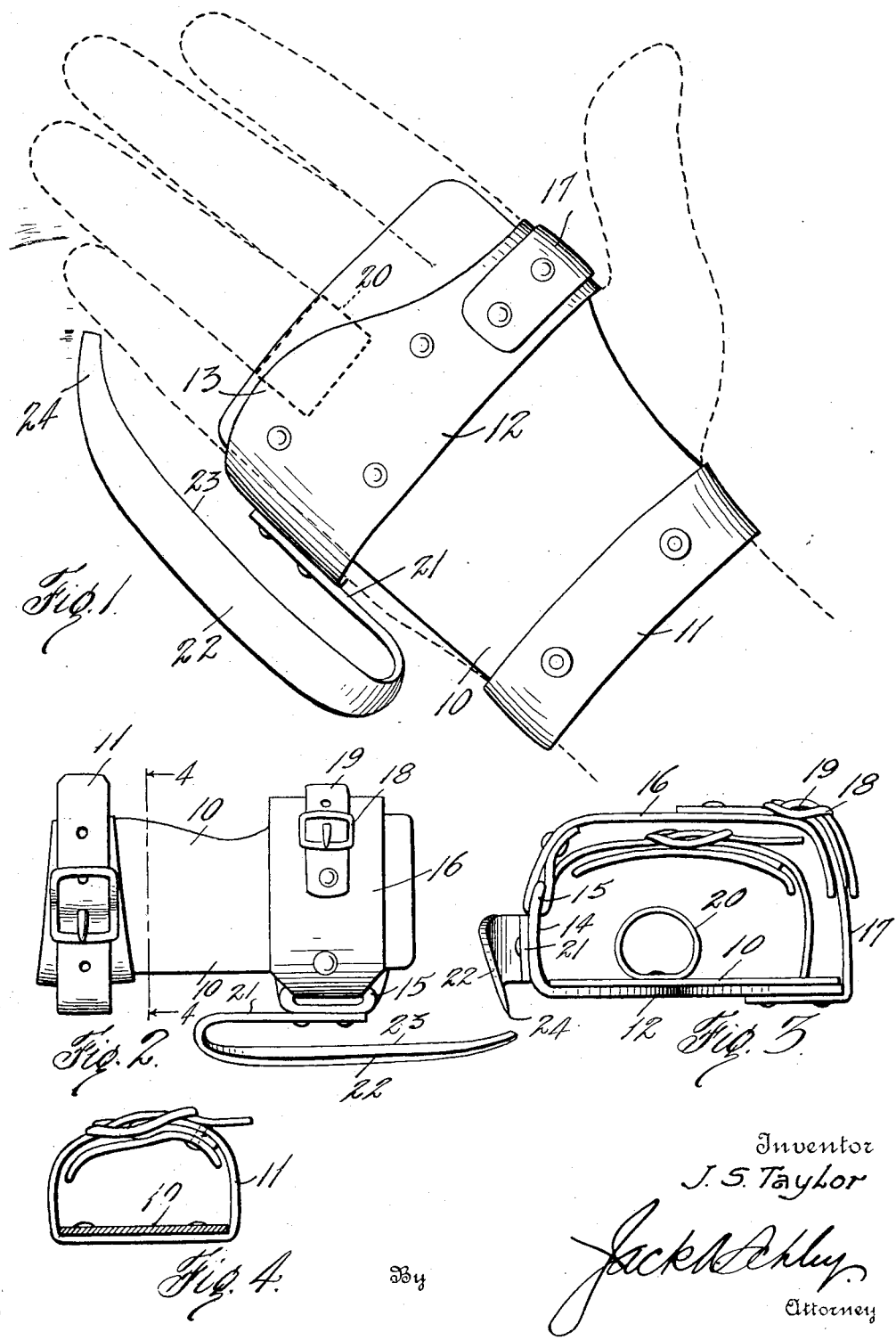

JOSEPH S. TAYLOR, OF PILOT POINT, TEXAS.

HAND-HARVESTER.

1,349,925. Specification of Letters Patent. Patented Aug. 17, 1920.

Application filed January 12, 1920. Serial No. 350,745.

*To all whom it may concern:*

Be it known that I, JOSEPH S. TAYLOR, a citizen of the United States, residing at Pilot Point, in the county of Denton and State of Texas, have invented certain new and useful Improvements in Hand-Harvesters, of which the following is a specification.

This invention pertains to new and useful improvements in hand harvesters.

The object of the invention is to provide a hand harvester which will adapt itself to a natural hand harvesting operation. In heading milo maize or Kafir corn the harvester reaches out, grasps the stalk just below the head and pulls it toward him so as to cut off the head. It is the purpose of this invention to mount a cutter on the harvester's hand in such a manner and in such a position, that as he pulls the stalk toward him, the cutter will enter the stalk diagonally and cut through the stalk as the motion is completed; thereby making it unnecessary for the harvester to bend the stalk back over the edge of the cutter or requiring him to exert pressure with his fingers or thumb.

In carrying out the invention I provide a hand harness of superior construction and having a sustaining member across the palm of the hand. A cutter is carried by the sustaining member at the side opposite the thumb, the same being the lower side when a stalk is grasped. The cutting edge of the cutter is so presented that the harvester merely has to grasp the stalk and pull it toward him to cause the knife-edge to enter the stalk. By tilting the lower edge of the hand inward, continuing the pull and permitting the stalk to slip slightly through the hand, the cutter passes diagonally through the stalk and severs the head with an easy and natural movement on the part of the harvester.

The invention will be more readily understood from a reading of the following specification and by reference to the accompanying drawings, in which an example of the invention is shown, and wherein:

Figure 1 is a perspective view showing an embodiment of the invention in position on a harvester's hand, Fig. 2 is a plan view of the device, Fig. 3 is a front end elevation of the same, and Fig. 4 is a cross-section on the line 4—4 of Fig. 2.

In the drawings the numeral 10 designates the hand piece of a harness. This hand piece is ample enough to substantially cover the palm of the hand and to extend back to the wrist, where it is fastened inside of a strap 11 which buckles around the wrist of the harvester. A sustaining member or rigid plate 12 is riveted or otherwise fastened on the piece 10, transversely, so as to extend across the palm of the wearer's hand near the fingers. The plate is given an extension, 13 by gradual curves, at one side.

This extension lends breadth and reduces the tendency of the plate to rock. The plate has an upturned bracket 14 adjacent the extension and this bracket terminates in an eye 15 which receives a binding strap 16. The bracket fits against the edge of the hand and the strap is fastened over the back of the hand by a tongue 19 fastened thereto and engaging a buckle 18 secured to a strap 17 fastened to the other end of the plate. The harness parts may be made of any suitable pliable material and it is of course adjustable for hands of different sizes. I also provide a finger loop 20 which aids in keeping the harness in position. It is to be understood, however, that the particular design and construction of the harness is not essential.

The very important feature of the invention is a cutter including a shank 21 and a cutting blade 22 having a cutting edge 23. The blade and shank are integral and the former is bent from the latter in return relation, the shank however, extending only about half the length of the blade. The shank is riveted or otherwise rigidly secured to the outside of the bracket 14 and is directed rearwardly; whereby the point 24 of the blade is directed forwardly and the point of attachment to the bracket is about midway of the blade. This arrangement disposes the cutting edge 23 along the edge of the palm of the hand and beyond the knuckles when the hand is closed around the stalk. The point 24 of the blade is curved slightly upward and the blade itself is disposed at an angle of inclination to the shank as well as being offset therefrom.

In using the harvester the wearer just reaches out and grasps the stalk below the head and pulls the same toward himself. The inclination of the blade is such that by giving a slight tilting movement to the hand, or by pulling slightly upward, the edge 23 is driven into the stalk. Then by continuing to pull the stalk toward himself, the wearer causes the blade to pass diagonally through said stalk and thus severs the head. The movement is made quickly and the stalk is bent so that the tendency of the stalk is to pull back against the cutting edge. The operator does not have to break the stalk across the cutting edge or bend the stalk over the blade with his thumb and fingers. The action is easy, natural and less fatiguing when my invention is used. Further there is practically no danger of injury to the hands or body.

What I claim, is:

A hand-harvester, comprising a plate to be arranged in the palm of the hand and extending transversely of the palm, means to secure the plate in place upon the hand, a cutting blade provided at its rear end with a shank bent back upon the blade and spaced therefrom in substantial parallel relation, said cutting blade extending longitudinally of the hand at the inner edge thereof when the palm is arranged uppermost and spaced therefrom for providing a longitudinal passage having its forward end open, said blade being transversely inclined and having its upper longitudinal edge sharpened, the sharpened edge being arranged approximately in the plane of the plate and the forward end of the blade being extended laterally, the blade being adapted to cut by pulling it toward said plate, and means for securing the shank to the plate.

In testimony whereof I affix my signature.

JOSEPH S. TAYLOR.